United States Patent [19]

Cooke et al.

[11] Patent Number: 5,047,898

[45] Date of Patent: Sep. 10, 1991

[54] DEFLECTABLE CONTACT FOR PROVIDING POSITIVE SURFACE CONTACT FOR SHIELDING ELECTROMAGNETIC INTERFERENCE

[75] Inventors: Kevin K. Cooke, Delray Beach; John R. Dewitt, Boca Raton; Paul J. Galinis, Boynton Beach, all of Fla.

[73] Assignee: International Business Machines Corporation, Armonk, N.Y.

[21] Appl. No.: 435,913

[22] Filed: Nov. 13, 1989

[51] Int. Cl.$^5$ .......................... H05K 9/00; H05K 7/02
[52] U.S. Cl. .................................. 361/424; 361/391; 361/393; 174/35 GC
[58] Field of Search ................. 174/35 GC, 35 R, 51; 361/212, 220, 391, 393, 394, 395, 399, 415, 424, 429; 364/708; 360/137

[56] References Cited

U.S. PATENT DOCUMENTS

| | | | |
|---|---|---|---|
| 4,058,846 | 11/1977 | Knutson et al. | 360/121 |
| 4,640,979 | 2/1987 | Schmalzl | 174/35 GC |
| 4,748,540 | 5/1988 | Henneberg et al. | 361/424 |
| 4,840,568 | 6/1989 | Burroughs et al. | 361/415 |

OTHER PUBLICATIONS

IBM Technical Disclosure Bulletin, vol. 11, No. 11, Apr. 1969, J. L. Steenburgh.
Tecknit ® Catalog 8565-69, Copyright 1969, Technical Wire Products Inc.

Primary Examiner—Leo P. Picard
Assistant Examiner—Michael W. Phillips
Attorney, Agent, or Firm—Anibal Jose Cortina

[57] ABSTRACT

There is disclosed an electromagnetic compatibility grounding connector having a contact portion deflectable between a first and a second position. In the first position only a line contact is established in contact with a complementary connector. In a second position a surface contact is established of greater surface contact area than the line contact. Electrical resistance is thus reduced and conductivity increased. Also disclosed is a support for an electronic device having such a connector and a personal computer housing having such supports and interconnecting with such connectors.

10 Claims, 4 Drawing Sheets

DEFLECTABLE CONTACT FOR PROVIDING POSITIVE SURFACE CONTACT FOR SHIELDING ELECTROMAGNETIC INTERFERENCE

BACKGROUND OF THE INVENTION

This invention relates to electromagnetic compatibility grounding connector for providing effective electromagnetic interference shielding. Further, the invention also relates to a support for an electronic device, specifically a direct access storage device, i.e., DASD, such as a hard disk drive, for mounting in a personal computer housing comprising the electromagnetic compatibility grounding connector. In yet still another aspect, the invention relates to an improvement in a personal computer housing having an electromagnetic interference shield panel with the improvement being a support for supporting an electronic device such as a DASD within the personal computer housing and with the support having the grounding connector for connection to the electromagnetic shield panel of the personal computer to provide effective shielding and grounding for the electronic device. For purposes of this disclosure, by electromagnetic compatibility (EMC) is meant the ability of the electronic equipment to perform without suffering or causing performance degradation due to electromagnetic absorption or electromagnetic emissions to its operational environment.

In personal computer design, electromagnetic compatibility (EMC) is critical to the operation thereof and an essential component of shielding design for its housing. More specifically, as industry develops faster and higher frequency systems, design criteria and techniques to meet required EMC standards must also increase.

As is well known to those of ordinary skill in the art, in designing personal computers to meet FCC requirements, it is desirable to shield and ground all electronic components and to do so with the shortest, least resistance, ground path possible. Typically, in the prior art designs, the ground path, from the critical component to the systems grounded base will be comprised of a number of conductive contacts from part to part until the component is finally grounded to the base. Often, as a result of design constraints, the length of the path must be maintained by means of a number of intermediate contact points. Each contact point, of course, increases the electrical resistance and causes great concern for ultimate grounding and shielding purposes. More specifically, in the past the typical contact has been a line or point contact which provides a high electrical resistance through the contact.

Accordingly, in accordance with the present invention the problems of increased resistance due to line or point contacts are greatly reduced.

SUMMARY OF THE INVENTION

In one aspect the invention is directed to an electromagnetic compatibility grounding connector which comprises a deflectable contact which is deflectable between a first position and a second position. The first position provides a line contact. A surface contact of greater contact surface area than the line contact is provided by deflection into the second position by means of pressure applied to the supporting structure. The deflectable contact is part of a ground connector which is ultimately connected to the ground of an electronic component.

In another aspect, the invention relates to a support for an electronic component such as a direct access storage device (DASD), i.e., such as a hard disk drive, for mounting in a personal computer housing. The support comprises a base which has a top surface and a bottom surface. The top surface is configured for having the component, e.g., DASD, mounted thereon. A connector is provided having a conductor portion on the top surface of the base which is configured for connection to a ground of the device. A deflectable contact portion extends outwardly from the horizontal plane of the base from the conductor portion and is deflectable between a first position and a second position. The first position provides a line contact when in contact with a complimentary contact, and when in the second position as a result of deflection by pressure on the supporting structure, the contact portion provides a surface contact of greater contact surface area than the line contact.

In yet still another aspect, the invention is an improvement in a personal computer housing having a top, bottom, sides, front and back, and having an electromagnetic interference shield panel mountable on the front adjacent the front surface thereof, and at least one electronic device, e.g., DASD, mounted on a movable support. Specifically, the improvement comprises the support which is a base having an upper surface and a lower surface, with the upper surface having the DASD mounted thereon. As will be described in greater detail later in FIG. 2, a connector includes a conductor which extends on the upper surface of the base dispersed between the DASD and the top surface, and is electrically connected to a ground connection of the DASD. A deflectable contact portion extends outwardly from the horizontal plane of the base from the conductor with the contact portion being deflectable between a first position and a second position. In the first position, the deflectable contact portion provides a line contact against a complementary contact and in the second position, due to pressure exerted thereon by the electromagnetic interference shield housing in physical and electrical contact therewith, it provides a surface contact with the complimentary contact of greater contact surface area than the point contact. As a result, when the personal computer housing is fully assembled there is provided enhanced shielding against electromagnetic interference as a result of the lower resistivity contact with the shield resulting from the increased surface contact area of the deflected contact.

Having briefly described the invention, the same will become better understood from the following detailed discussion presented herein with reference to the attached drawings.

DETAILED DISCUSSION OF THE INVENTION

Figures 1A, 1B:
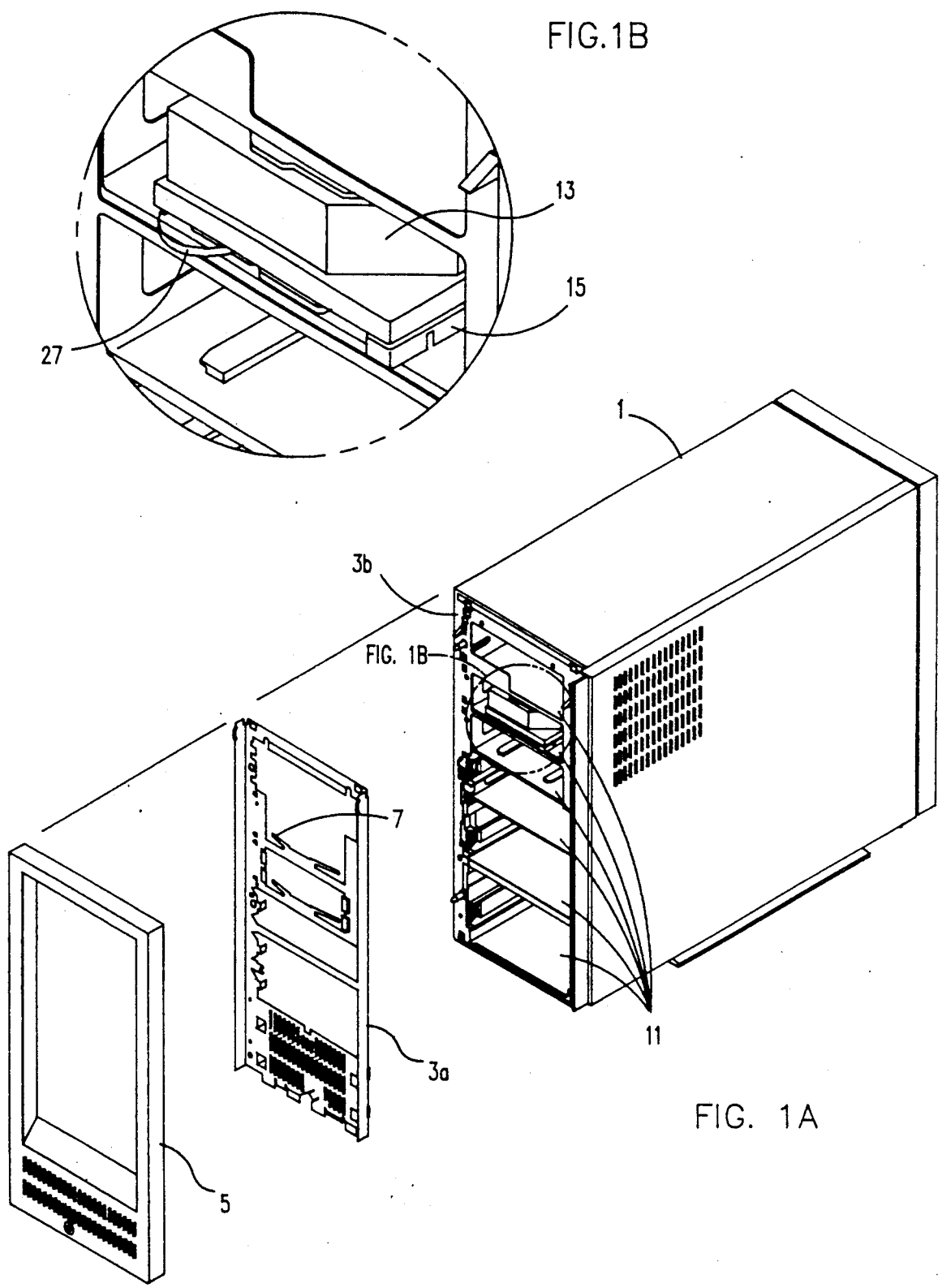
FIG. 1A is a partially disassembled perspective view of a personal computer housing showing the grounding connector having a contact portion in accordance with the present invention.
FIG. 1B is an enlarged view of the circled portion of FIG. 1A showing in greater detail the contact portion in undeflected form prior to abutment with an electromagnetic shield of the personal computer housing.

In FIG. 1A there is shown a personal computer housing 1 in partially disassembled form where an electromagnetic interference (EMI) shield 3a is shown separated from its supporting panel 3b of the personal computer 1. Also shown disassembled is the cover 5 of the personal computer. The electromagnetic shield 3a, preferably of, e.g., sheet metal, includes complementary contacts 7 for contacting against the contact 27 (shown in FIG. 1B) in accordance with the invention. The personal computer includes an electronic component bay structure 11 for having electronic components such as DASDs mounted on a support 15 having the connector 23 (shown in FIG. 2) with the contact portion 27 in accordance with the invention shown in the circled portion and described in greater detail with reference to FIG. 1B. More specifically, in FIG. 1B there is shown a DASD such as a hard disk drive 13 on a slideable support 15 which is typically made of an electronically insulating material. Shown projecting from the DASD 13 and outwardly from the support is a deflectable contact 27 which engages with contact 7 of the EMI shield 3a. The engagement between the contacts will be explained in greater detail with reference to the other figures.

Figure 2:
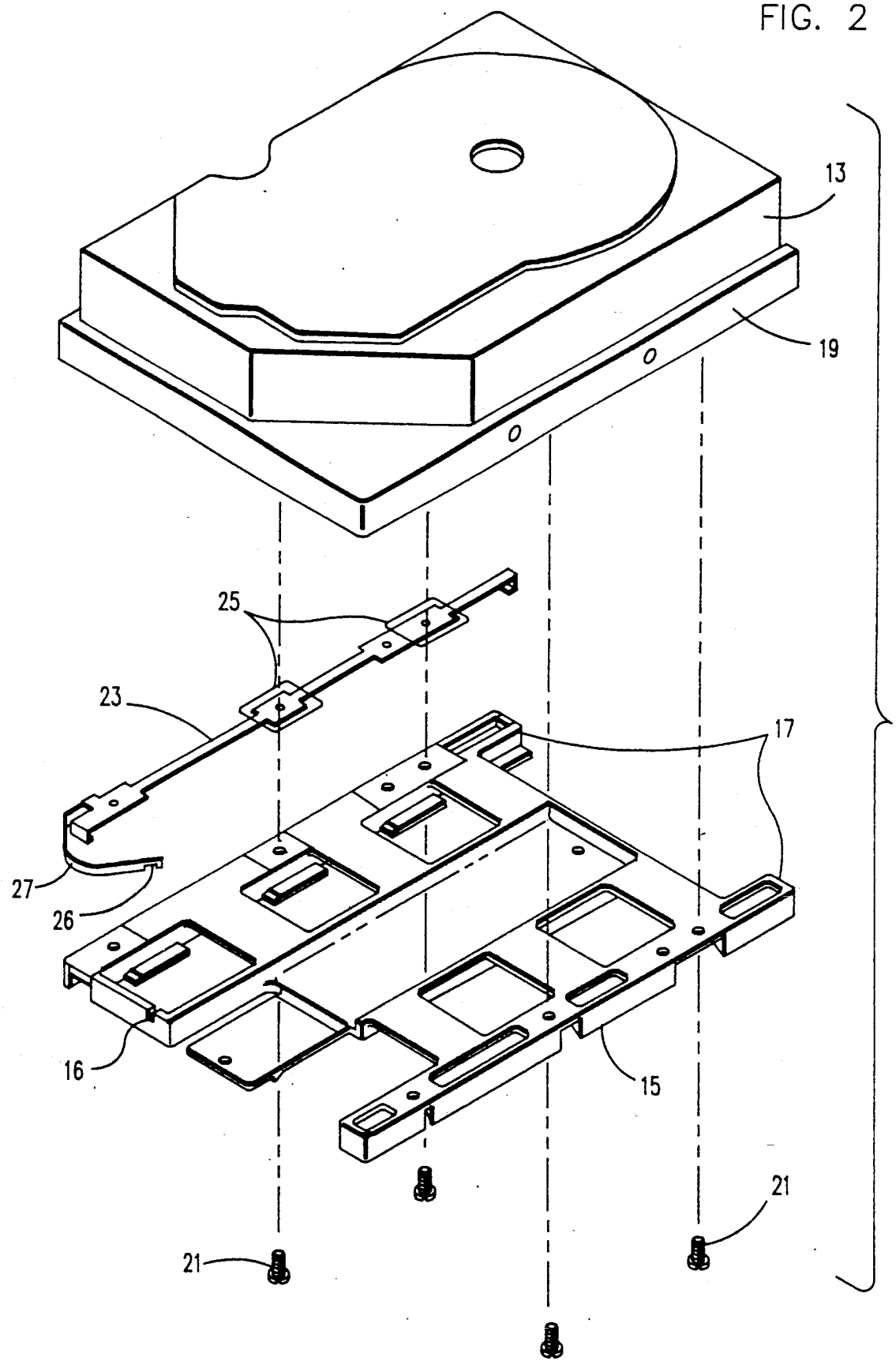
FIG. 2 is a disassembled perspective view of a removable support for an electronic device such as a DASD showing the contact portion of the invention and its relationship to the DASD and its support.

In FIG. 2 there is shown a disassembled view of the DASD 13, connector 23 and its support 15. As readily apparent from FIG. 2, the DASD 13 includes a metal base support 19 which serves as a ground connector for the DASD 13. In this instance it is noted that the invention is being described with reference to a DASD. It should be noted that such reference is for example purposes only and that the invention can be employed with other electronic components of the type requiring a ground contact and/or shielding. Continuing, it is also shown that the metal support 19 is connected to the DASD 13 for grounding purposes with the connection to the grounded electronic circuits of the device not shown. The metal ground plate 19 serves to connect to the connector 23, and is secured to the support 15 and the connector 23 by means of connector securing portions 25 through which screws 21 are inserted through the support 15 and into the ground plate 19. The support 15 includes slide portions 17 for ease of sliding into and out of the bays 11 of the personal computer housing 1. FIG. 2 also shows the flexible contact portion 27 which at the distal end includes a notch portion 26 which engages with a corresponding notch 16 of the support 15. The purpose of this notch is to limit the inward movement of the contact portion 27 so that it forces the contact upon pressure being exerted thereon to deform. On the other hand, since it does allow some movement, the notch permits the flexible contact portion 27 some flexibility of movement relative to the position of contact 7 to result in some adjustability of position prior to deflecting to achieve the result of the largest area of surface contact possible. It is also noted that the contact portion 27 is rotated 90 degrees relative to the conductor of the connector 23 which extends on the upper surface of the support 15. This facilitates establishing of the surface contact against contact 7 of shield 3a.

Figure 3:
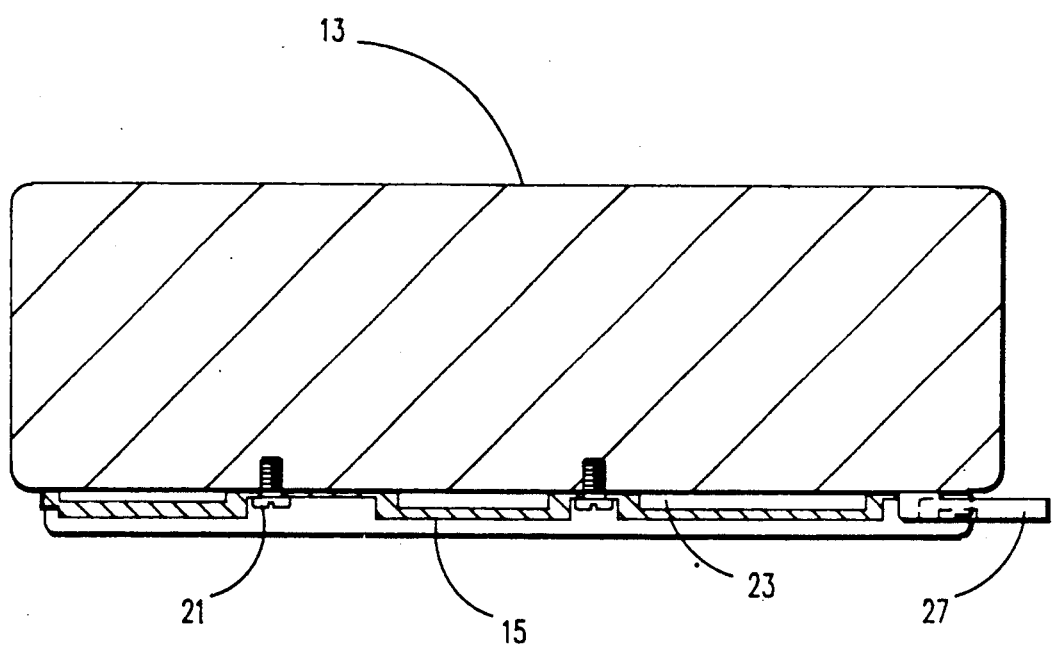
FIG. 3 is a side partial cross-sectional view showing an electronic device mounted on a support connected to the connector in accordance with the invention.

FIG. 3 schematically shows in partial cross-sectional side view the DASD 13 mounted by means of screws 21 onto the support 15. Shown interposed between the support 15 and the DASD 13 is the connector 23 having the flexible contact portion 27 projecting horizontally therefrom.

Figure 4A:
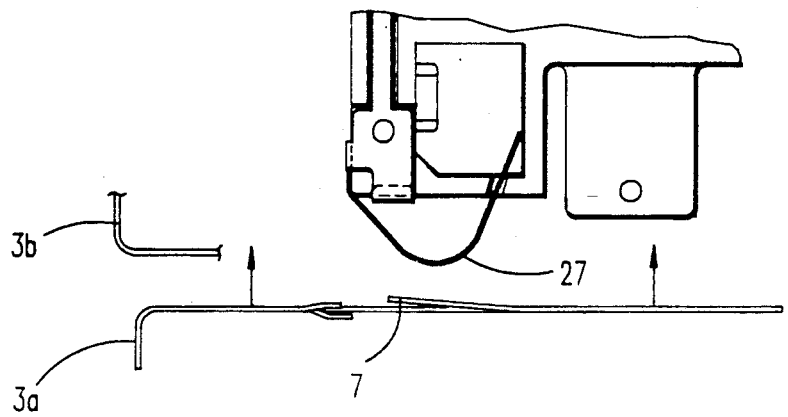
FIGS. 4A, 4B, and 4C show in progression the relationship between the deflectable contact member in accordance with the invention as it engages with the electromagnetic shield within personal computer assembly, and deflects from a line contact into a surface contact with consequent reduction in resistance between the contacts to provide enhanced conductivity and shielding.
Figure 4B:
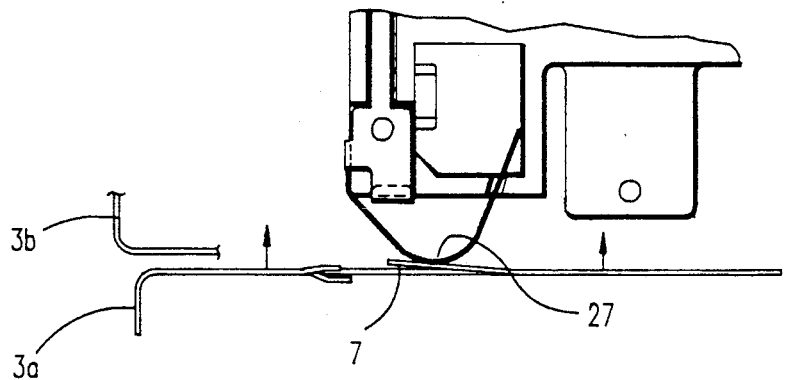
Figure 4C:
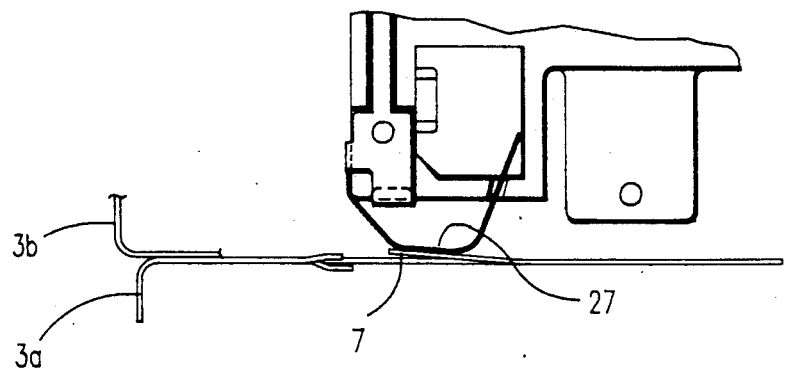

In FIGS. 4A-4B there is shown the progressive deflection of the contact 27 as the EMI shield 3a is brought into contact with the corresponding face 3b of the personal computer assembly. FIG. 4A shows the contact portion 27 spaced from its corresponding engaging contact 7 of EMI shield 3a as the shield 3a is bought progressively closer to face 3b and there is first established a line contact between deflectable contact portion 27 and its engaging contact 7 of the shield 3a. Upon full assembly the flexible contact portion 27 deforms as shown in FIG. 4C, engaging contact 7 over a greater surface area thereby providing for a reduced resistance electrical connection.

As to the materials for the support 15, it is preferably of polycarbonate, an insulator. This allows ease of sliding and engaging with other plastic-like parts in the computer housing bays 11. Alternatively, the support 15 can be of metal such as sheet metal or any other like material which is easily formed.

With respect to the connector 23, it is preferably of stamped stainless steel. Alternative materials include stamped beryllium copper or spring steel as well as other conventional well known exotic alloys presently available in the marketplace. A problem with spring steel is that it oxidizes, reducing conductivity and increasing resistance thereby adversely affecting the control of EMI. The more exotic alloys are problematic because although performance is improved, cost far outweighs any improvement in performance.

Having thus described the invention, the scope thereof will be better understood from the appended claims.

We claim:

1. In a personal computer assembly including a housing having an electromagnetic interference shield panel mountable on one surface thereon adjacent a front surface of at least one electronic device mounted on a movable support, the improvement comprising:

said shield panel having a first contact spaced from said support and said electronic device;

said support being a base having an upper surface and a lower surface, said upper surface having said electronic device mounted thereon;

and a grounding connector mounted on said support and providing a low resistivity grounding path between said electronic device and said shield, said grounding connector comprising conductive means and a second contact;

said conductive means being mounted on said support between said upper surface of said base and said electronic device, said conductive means being mechanically and electrically connected to a ground connection of said electronic device; and said second contact extending from said base into grounding electrical engagement with said first contact, said second contact being connected to said conductive means, and said second contact being deflectable and deformable by said first contact between a first position and a second position, for providing a line contact with said first contact when in said first position, and for providing a low resistivity surface contact in which said second contact is deformed against said first contact to provide greater contact surface area than said line contact when deflected into said second position by pressure exerted thereon by said first contact and said electromagnetic interference shield panel, when said personal computer assembly is fully assembled, to provide enhanced shielding against electromagnetic interference.

2. A personal computer assembly as in claim 1 wherein said conductive means is a straight strip of stamped metal and said second contact is a strip of stamped metal integral with and extending from said conductive means between said support and said first contact, said second contact having an arcuate shape when in said first position, said second contact having a deformed shape when in said second position, said deformed shape including a medial section deformed against said first contact and lying between two arcuate end portions, one of said end portions being joined to said conductive means.

3. A personal computer assembly as in claim 2 wherein said conductive means is made of stainless steel and said support is made of polycarbonate material.

4. A personal computer assembly as in claim 2 wherein said second contact is fixed at both ends to said support and extends horizontally therefrom.

5. A personal computer assembly as in claim 4 wherein one end of said second contact is loosely connected in a manner permitting a sufficient amount of play before said second contact deflects sufficiently to ensure a maximum area of surface contact when deflected and deformed into said second position by said first contact.

6. A personal computer assembly as in claim 2 wherein said electronic device is a DASD.

7. A personal computer assembly as in claim 6 wherein said DASD is a hard disk drive.

8. A personal computer assembly as in claim 7 further comprising a plurality of hard disk drives on a corresponding plurality of supports having a corresponding plurality of conductive means and second contacts all mounted in said housing.

9. A personal computer assembly as in claim 6 wherein said DASD includes a grounding base support electrically engaged with said conductive means.

10. A personal computer assembly as in claim 2 wherein said straight strip is horizontal and said second contact is rotated 90 degrees relative to said horizontal straight strip and extends vertically.

* * * * *